(12) United States Patent
Li et al.

(10) Patent No.: US 11,178,622 B2
(45) Date of Patent: Nov. 16, 2021

(54) DATA PROCESSING METHOD, TERMINAL, AND BASE STATION

(71) Applicant: Huawei Technologies Co., Ltd., Shenzhen (CN)

(72) Inventors: Guorong Li, Shenzhen (CN); Lili Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 98 days.

(21) Appl. No.: 16/338,646

(22) PCT Filed: Sep. 30, 2016

(86) PCT No.: PCT/CN2016/101315
§ 371 (c)(1),
(2) Date: Apr. 1, 2019

(87) PCT Pub. No.: WO2018/058634
PCT Pub. Date: Apr. 5, 2018

(65) Prior Publication Data
US 2019/0364518 A1 Nov. 28, 2019

(51) Int. Cl.
*H04B 7/185* (2006.01)
*H04W 52/36* (2009.01)
(Continued)

(52) U.S. Cl.
CPC ......... *H04W 52/365* (2013.01); *H04L 5/0051* (2013.01); *H04L 25/0226* (2013.01);
(Continued)

(58) Field of Classification Search
CPC .................................................. H04W 52/365
See application file for complete search history.

(56) References Cited

U.S. PATENT DOCUMENTS

| | | | |
|---|---|---|---|
| 9,439,158 B2 * | 9/2016 | Loehr | H04W 52/365 |
| 2010/0232385 A1 * | 9/2010 | Hsu | H04W 74/02 |
| | | | 370/329 |

(Continued)

FOREIGN PATENT DOCUMENTS

| | | |
|---|---|---|
| CN | 102893679 A | 1/2013 |
| CN | 103813430 A | 5/2014 |

(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 13)," 3GPP TS 36.321, V13.2.0, Jun. 2016, 91 pages.

(Continued)

*Primary Examiner* — Guang W Li
(74) *Attorney, Agent, or Firm* — Conley Rose, P.C.

(57) ABSTRACT

A data processing method, a terminal, and a base station to perform power headroom report (PHR) reporting for an sounding reference signal only component carrier (SRS-only CC). The method includes a terminal generating a power headroom report for a SRS-only CC when a preset condition is satisfied. The method further includes the terminal sending the PHR report to a base station.

20 Claims, 2 Drawing Sheets

(51) Int. Cl.
*H04W 76/11* (2018.01)
*H04L 5/00* (2006.01)
*H04L 25/02* (2006.01)
*H04W 52/24* (2009.01)
*H04W 80/02* (2009.01)

(52) U.S. Cl.
CPC .......... *H04W 52/242* (2013.01); *H04W 76/11* (2018.02); *H04W 80/02* (2013.01)

(56) References Cited

U.S. PATENT DOCUMENTS

| | | | |
|---|---|---|---|
| 2012/0176915 A1* | 7/2012 | Lee | H04W 52/241 370/248 |
| 2012/0176923 A1* | 7/2012 | Hsu | H04W 52/243 370/252 |
| 2013/0010720 A1* | 1/2013 | Lohr | H04L 5/0055 370/329 |
| 2013/0128856 A1* | 5/2013 | Iwai | H04L 5/001 370/329 |
| 2013/0215811 A1* | 8/2013 | Takaoka | H04W 28/0268 370/311 |
| 2014/0023010 A1* | 1/2014 | Loehr | H04W 52/365 370/329 |
| 2015/0087296 A1* | 3/2015 | Kim | H04W 24/10 455/422.1 |
| 2015/0358920 A1* | 12/2015 | Sorrentino | H04W 52/242 455/522 |
| 2015/0358927 A1* | 12/2015 | Gao | H04L 5/001 370/329 |
| 2016/0174173 A1* | 6/2016 | Lee | H04J 3/00 370/280 |
| 2016/0249299 A1* | 8/2016 | Ahn | H04L 5/0053 |
| 2016/0337989 A1 | 11/2016 | Chen | |
| 2017/0078983 A1* | 3/2017 | Ahn | H04W 52/34 |
| 2017/0311337 A1 | 10/2017 | Mo et al. | |
| 2018/0014264 A1 | 1/2018 | Huang et al. | |
| 2018/0199353 A1* | 7/2018 | Ahn | H04W 74/08 |
| 2019/0223117 A1* | 7/2019 | Chai | H04W 52/367 |
| 2019/0253985 A1* | 8/2019 | Dinan | H04W 72/0413 |

FOREIGN PATENT DOCUMENTS

| | | |
|---|---|---|
| CN | 103974319 A | 8/2014 |
| CN | 104703271 A | 6/2015 |
| CN | 104796940 A | 7/2015 |
| CN | 105356967 A | 2/2016 |
| EP | 2360865 A1 | 8/2011 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 13)," 3GPP TS 36.331, V13.2.0, Jun. 2016, 623 pages.

Samsung, "SRS Transmission without PUSCH," R1-166739, 3GPP TSG RAN WG1 #86, Gothenburg, Sweden, Aug. 22-26, 2016, 3 pages.

Huawei, et al., "Revised WID: SRS (sounding reference signal) switching between LTE component carriers," RP-160935, 3GPP TSG RAN Meeting #72, Busan, Korea, Jun. 13-16, 2016, 7 pages.

Foreign Communication From a Counterpart Application, PCT Application No. PCT/CN2016/101315, English Translation of International Search Report dated Jun. 30, 2017, 2 pages.

Foreign Communication From a Counterpart Application, PCT Application No. PCT/CN2016/101315, English Translation of Written Opinion dated Jun. 30, 2017, 4 pages.

Foreign Communication From a Counterpart Application, Chinese Application No. 201680086629.X, Chinese Office Action dated Dec. 31, 2019, 7 pages.

Huawei, et al., "Details on power control for SRS on TDD CCs without PUSCH," R1-166128, 3GPP TSG RAN WG1 Meeting #86, Gothenburg, Sweden, Aug. 22-26, 2016, 3 pages.

"LTE; Evolved Universal Terrestrial Radio Access (E-UTRA); Medium Access Control (MAC) protocol specification (3GPP TS 36.321 version 13 2.0 Release 13)," ETSI TS 136 321 V13.2.0, Aug. 2016, 93 pages.

* cited by examiner

DATA PROCESSING METHOD, TERMINAL, AND BASE STATION

CROSS-REFERENCE TO RELATED APPLICATIONS

This application is a National Stage of International Application No. PCT/CN2016/101315, filed on Sep. 30, 2016, which is hereby incorporated by reference in its entirety.

TECHNICAL FIELD

Embodiments of this application relate to the communications field, and in particular, to a data processing method, a terminal, and a base station.

BACKGROUND

During Long Term Evolution (English full name: Long Term Evolution, LTE for short) protocol evolution, a carrier aggregation (English full name: Carrier Aggregation, CA for short) technology is introduced. In the technology, a terminal is allowed to send and receive data on a plurality of carriers simultaneously. For each terminal performing CA, a cell serves as a primary serving cell (English full name: Primary Cell, PCell for short) of the terminal, and a cell of another carrier serves as a secondary serving cell (English full name: Secondary Cell, SCell for short) of the terminal. The terminal may send and receive data on a plurality of aggregated cells. Herein, an LTE system supporting CA is referred to as an LTE CA system.

When the terminal performs fast carrier switching, in a subframe, the terminal may send a physical uplink shared channel (English full name: Physical Uplink Shared Channel, PUSCH for short) or a physical uplink control channel (English full name: Physical Uplink Control Channel, PUCCH for short) in some cells, and send only a sounding reference signal (English full name: Sounding Reference Signal, SRS for short) in some other cells. Due to limited uplink transmit power of the terminal, a sum of uplink transmit power of the terminal in the cells or on component carriers should not exceed maximum transmit power of the terminal. Therefore, if the terminal makes a power headroom report (English full name: Power Headroom Report, PHR for short) for a sounding reference signal only component carrier (English full name: Sounding Reference Signal only Component Carriers, SRS-only CC for short), a base station can learn of the uplink transmit power of the terminal in each cell or on each component carrier, to perform corresponding uplink scheduling.

However, in a current PHR reporting mechanism, the terminal performs PHR reporting only for some cells in which a PUSCH or PUCCH is sent, without performing PHR reporting for the SRS-only CC.

SUMMARY

Embodiments of this application provide a data processing method, a terminal, and a base station, to perform PHR reporting for an SRS-only CC.

According to a first aspect, an embodiment of this application provides a data processing method, including:

when the terminal determines that the terminal satisfies a preset condition, generating, by the terminal, a PHR report for the SRS-only CC, and then, sending the PHR report to a base station.

In this embodiment of this application, the terminal sends the PHR report for the SRS-only CC to the base station. This helps the base station learn of uplink transmit power of the terminal on the SRS-only CC, to perform corresponding uplink scheduling.

Optionally, the preset condition in this embodiment of this application may be at least one of the following several possible implementations:

In a possible implementation, the preset condition is that the terminal receives an indication message sent by the base station, where the indication message is used to instruct the terminal to trigger the PHR for the SRS-only CC.

In another possible implementation, the preset condition is that the terminal determines that a power variation or a path loss variation on the SRS-only CC exceeds a first preset value.

In this implementation, the terminal needs to obtain the power variation or the path loss variation on the SRS-only CC, and determines whether the power variation or the path loss variation on the SRS-only CC exceeds the first preset value; and if yes, the terminal generates PHR reports for one or more SRS-only CCs.

In another possible implementation, the preset condition is that the terminal determines that a power variation or a path loss variation on a reference SRS-only CC exceeds a second preset value, where the reference SRS-only CC is preconfigured by the base station for the terminal.

In this implementation, the terminal needs to obtain the power variation or the path loss variation on the reference SRS-only CC, and determines whether the power variation or the path loss variation on the reference SRS-only CC exceeds the second preset value; and if yes, the terminal generates PHR reports for one or more SRS-only CCs.

In another possible implementation, the preset condition is that the terminal determines that the SRS-only CC is reconfigured.

In this embodiment of this application, the PHR for the SRS-only CC is implemented in a plurality of manners, to facilitate timely and accurate PHR reporting. In addition, when the base station sends, to the terminal, the indication message used to instruct the terminal to trigger the PHR for the SRS-only CC, a time interval for reporting can be more diversified and more flexible.

Optionally, in this embodiment of this application, the PHR report includes a field Ci, a field R, a field V, a field PH, a field P, and a field PCMAX,c; Ci is used to indicate whether there is a field PH for a secondary serving cell having a secondary serving cell index; R is a reserved bit, and is set to 0; V is used to indicate that a power headroom value PH is calculated based on a format for actual sending or a reference format; PH is used to indicate the power headroom value; P is used to indicate whether power backoff is applied to Medium Access Control MAC; and PCMAX,c is used to indicate maximum transmit power $P_{CMAX,c}$ or $\tilde{P}_{CMAX,c}$ of the terminal in a cell c that is used to calculate PH.

Based on a format of the foregoing PHR report, the terminal may generate the PHR report for the SRS-only CC in the following several manners:

In a possible implementation, the terminal generates the field Ci, the field R, the field V, the field PH, the field P, and the field PCMAX,c; when the terminal reports the PHR for the SRS-only CC, the terminal sets Ci to 1; when the terminal does not report the PHR for the SRS-only CC, the terminal sets Ci to 0; when the terminal determines that an SRS is sent on the SRS-only CC, the terminal sets V to 0, and calculates PH by using a first formula; and when the terminal determines that no SRS is sent on the SRS-only CC, the terminal sets V to 1, and calculates PH by using a second formula.

In another possible implementation, if the terminal determines that the SRS is sent on the SRS-only CC, the terminal generates the field Ci, the field R the field PH, the field P, and the field PCMAX,c; when the terminal reports the PHR for the SRS-only CC, the terminal sets Ci to 1; and when the terminal does not report the PHR for the SRS-only CC, the terminal sets Ci to 0, and calculates PH by using the first formula.

In another possible implementation, the terminal generates the field Ci, the field V, the field PH, the field P, the field PCMAX,c a field I, and a field S; when the PHR report is a PHR report for the SRS-only CC, the terminal sets I to 1, and the terminal sets V to 0; when the terminal determines that an SRS is sent on the SRS-only CC, the terminal sets S to 0, and calculates PH by using the first formula; and when the terminal determines that no SRS is sent on the SRS-only CC, the terminal sets S to 1, and calculates PH by using the second formula.

In another possible implementation, the PHR report further includes a PHR report for a primary serving cell PCell and a PHR report for a secondary serving cell SCell.

Optionally, the first formula is as follows:

$$PH_{typel,c}(i) = P_{CMAX,c}(i) - \{10 \log_{10}(M_{SRS,c}(i)) + P_{O\_SRS,c}(1) + \alpha_{SRS,c} \cdot PL_c + f_c(i)\},$$

where i is a subframe number; c is a cell index; $PH_{typel,c}$ is power headroom in a cell; $P_{CMAX,c}$ is configured maximum transmit power in the cell; $M_{SRS,c}$ is a quantity of bandwidth resources occupied when the SRS is actually sent in the cell; $P_{O\_SRS,c}(1)$ is power at which the base station expects to receive the SRS; $\alpha_{SRS,c}$ is a cell path loss compensation coefficient; $PL_c$ is a cell path loss; and $f_c(i)$ is cell power adjustment; and the second formula is as follows:

$$PH_{typel,c}(i) = \tilde{P}_{CMAX,c}(i) - \{P_{O\_SRS,c}(1) + \alpha_{SRS,c} \cdot PL_c + f_c(i)\},$$

where i is a subframe number; c is a cell index; $PH_{typel,c}$ is power headroom in a cell; $\tilde{P}_{CMAX,c}$ is a linear average of $P_{CMAX,c}$; $P_{O\_SRS,c}(1)$ is power at which the base station expects to receive the SRS; $\alpha_{SRS,c}$ is a cell path loss compensation coefficient; $PL_c$ is a cell path loss; and $f_c(i)$ is cell power adjustment.

In this embodiment of this application, the terminal may generate the PHR report for the SRS-only CC by using a plurality of formats, thereby improving diversity of the PHR report for the SRS-only CC.

According to a second aspect, an embodiment of this application provides a data processing method, including:

sending, by a base station, an indication message to a terminal, where the indication message is used to instruct the terminal to trigger a PHR for the SRS-only CC; and receiving, by the base station, the PHR report, where the PHR report is generated by the terminal after the terminal receives the indication message.

Optionally, the base station may send the indication message to the terminal in the following several manners:

In a possible implementation, the base station sends, to the terminal, a Medium Access Control control element (English full name: Medium Access Control Control Element, MAC CE for short) including a field Ci, where Ci is used to indicate a cell index Cell index of the SRS-only CC.

In another possible implementation, the base station sends a radio network temporary identifier (English full name: RNTI Radio Network Temporary Identity, RNTI for short) to the terminal, so that the terminal triggers the PHR for the SRS-only CC when detecting downlink control signaling for addressing the RNTI.

In another possible implementation, the base station adds a target bit to downlink control information, where the target bit is used to instruct the terminal to trigger the PHR for the SRS-only CC.

In this embodiment of this application, the indication message may instruct the terminal to trigger the PHR for the SRS-only CC and may further indicate information included in the PHR reported by the terminal. A specific form is not limited herein.

In this embodiment of this application, the base station may send the indication message to the terminal in a plurality of forms, so that a time interval at which the indication message is sent is more flexible.

According to a third aspect, an embodiment of this application provides a terminal. The terminal implements a function of the terminal in the foregoing method. The function may be implemented by hardware, or may be implemented by hardware by executing corresponding software. The hardware or the software includes one or more modules corresponding to the foregoing function.

In a possible implementation, the terminal includes:

a processing module, configured to: when a preset condition is satisfied, generate a power headroom report PHR report for a sounding reference signal only component carrier SRS-only CC; and a sending module, configured to send the PHR report generated by the processing module to a base station.

In another possible implementation, the terminal includes:

a transceiver, a processor, and a bus, where the transceiver is connected to the processor by using the bus;

the processor specifically performs the following step:

when a preset condition is satisfied, generating a power headroom report PHR report for a sounding reference signal only component carrier SRS-only CC; and the transceiver specifically performs the following step:

sending the PHR report generated by the processing module to a base station.

According to a fourth aspect, an embodiment of this application provides a base station. The base station implements a function of the base station in the foregoing method. The function may be implemented by hardware, or may be implemented by hardware by executing corresponding software. The hardware or the software includes one or more modules corresponding to the foregoing function.

In a possible implementation, the base station includes:

a sending module, configured to send an indication message to a terminal, where the indication message is used to instruct the terminal to trigger a PHR for the SRS-only CC; and a receiving module, configured to receive the PHR report, where the PHR report is generated by the terminal after the terminal receives the indication message.

In another possible implementation, the base station includes:

a transceiver, a processor, and a bus, where the transceiver is connected to the processor by using the bus; and the transceiver specifically performs the following steps:

sending an indication message to a terminal, where the indication message is used to instruct the terminal to trigger a PHR for the SRS-only CC; and receiving the PHR report, where the PHR report is generated by the terminal after the terminal receives the indication message.

According to a fifth aspect, an embodiment of this application provides a computer storage medium. The computer storage medium stores program code, and the program code is used to instruct to perform the method according to the first aspect or the second aspect.

In the technical solution provided in the embodiments of this application, when satisfying the preset condition, the terminal generates the PHR report for the SRS-only CC, and then sends the PHR report to the base station. To be specific, this helps the base station learn of uplink transmit power of the terminal on the SRS-only CC, to perform corresponding uplink scheduling.

DESCRIPTION OF EMBODIMENTS

The following clearly and completely describes the technical solutions in the embodiments of this application with reference to the accompanying drawings in the embodiments of this application. Apparently, the described embodiments are merely some but not all of the embodiments of this application. All other embodiments obtained by persons skilled in the art based on the embodiments of this application without creative efforts shall fall within the protection scope of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way is interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

Figure 1:
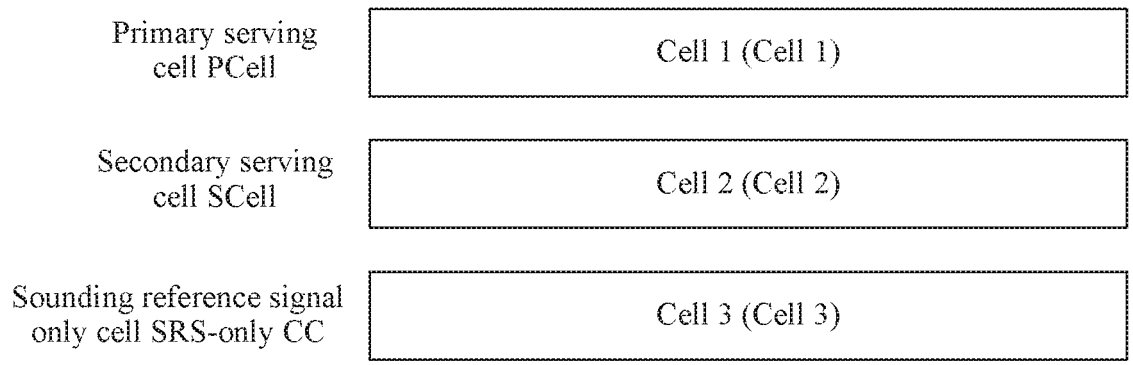
FIG. 1 is a schematic diagram of a system framework structure according to an embodiment of this application.

A system architecture to which the present invention is applied is shown in FIG. 1. In an LTE CA system, each terminal has one PCell (a cell 1), and one or more SCells (such as a cell 2). These cells are all serving cells of the terminal. In addition, an eNB may configure one or more SRS-only CCs (such as a cell 3) for the terminal. The PCell and the SCell may be used to provide a transmission resource for uplink and/or downlink data transmission between a network device and a terminal. The terminal receives paging in the PCell, and may perform a contention-based random access process in the PCell. The terminal periodically or aperiodically sends an SRS on an SRS-only CC only in a configuration performed by the base station.

In the LTE CA system, when the terminal performs fast carrier switching, in a subframe, the terminal may send a PUSCH or PUCCH in some cells, and send only an SRS in some other cells. Due to limited uplink transmit power of the terminal, a sum of uplink transmit power of the terminal in the cells or on component carriers should not exceed maximum transmit power of the terminal. Therefore, if the terminal makes a PHR for an SRS-only CC, a base station can learn of the uplink transmit power of the terminal in each cell or on each component carrier, to perform corresponding uplink scheduling. However, in a current PHR reporting mechanism, the terminal performs PHR reporting only for some cells in which a PUSCH or PUCCH is sent, without performing PHR reporting for the SRS-only CC.

To resolve the problem, embodiments of this application provide the following technical solution: When the terminal determines that the terminal satisfies a preset condition, the terminal generates a PHR report for the SRS-only CC; and the terminal sends the PHR report to the base station.

Figure 2:
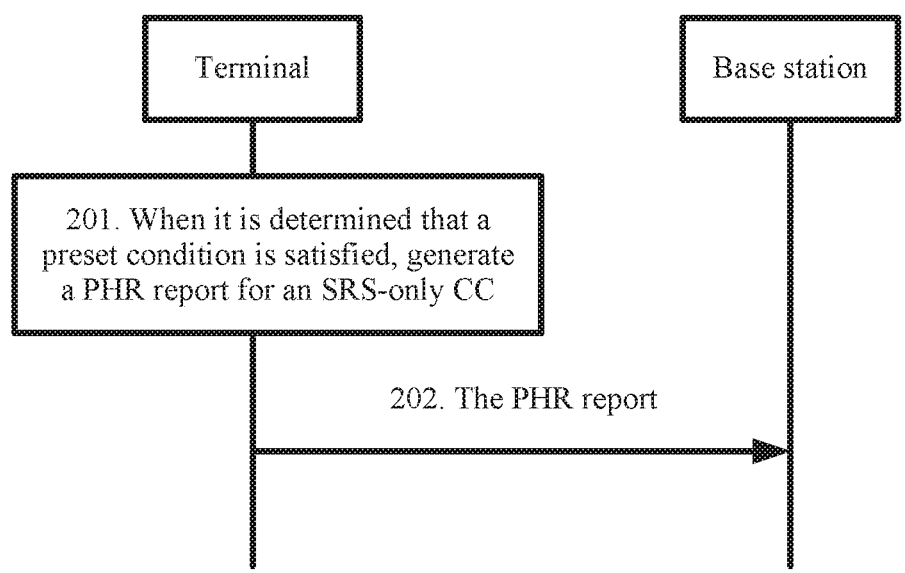
FIG. 2 is a schematic diagram of an embodiment of a data processing method according to an embodiment of this application.

Specifically, referring to FIG. 2, an embodiment of a data processing method in the embodiments of this application includes the following steps.

201. When a terminal determines that a preset condition is satisfied, the terminal generates a PHR report for an SRS-only CC.

When the terminal determines during running that the terminal satisfies the preset condition, the terminal generates the PHR report for the SRS-only CC.

In actual application, the preset condition may be at least one of the following several cases:

In a case, the terminal receives an indication message sent by the base station, where the indication message is used to instruct the terminal to trigger the PHR for the SRS-only CC.

In another possible implementation, the preset condition is that the terminal determines that a power variation or a path loss variation on the SRS-only CC exceeds a first preset value.

In this implementation, the terminal needs to obtain the power variation or the path loss variation on the SRS-only CC, and determines whether the power variation or the path loss variation on the SRS-only CC exceeds the first preset value; and if yes, the terminal generates PHR reports for one or more SRS-only CCs.

In another possible implementation, the preset condition is that the terminal determines that a power variation or a path loss variation on a reference SRS-only CC exceeds a second preset value, where the reference SRS-only CC is preconfigured by the base station for the terminal.

In this implementation, the terminal needs to obtain the power variation or the path loss variation on the reference SRS-only CC, and determines whether the power variation or the path loss variation on the reference SRS-only CC exceeds the second preset value; and if yes, the terminal generates PHR reports for one or more SRS-only CCs.

In another possible implementation, the preset condition is that the terminal determines that the SRS-only CC is reconfigured.

In actual application, the PHR report generated by the terminal includes content provided in Table 1.

TABLE 1

| C7 | C6 | C5 | C4 | C3 | C2 | C1 | R |
|----|----|----|----|----|----|----|---|
| P  | V  |    |    | PH (Type 2, PCell) | | | |
| R  | R  |    |    | PCMAX, $c_1$ | | | |
| P  | V  |    |    | PH (Type 1, PCell) | | | |
| R  | R  |    |    | PCMAX, $c_2$ | | | |
| P  | V  |    |    | PH (Type 1, SCell 1) | | | |
| R  | R  |    |    | PCMAX, $c_3$ | | | |
|    |    |    |    | ... | | | |
| P  | V  |    |    | PH (Type 1, SCell n) | | | |
| R  | R  |    |    | PCMAX, $c_m$ | | | |

A field Ci, a field R, a field V, a field PH, a field P, and a field PCMAX,c are included; Ci is used to indicate whether there is a field PH for a secondary serving cell having a secondary serving cell index; R is a reserved bit, and is set to 0; V is used to indicate that a power headroom value PH is calculated based on a format for actual sending or a reference format; PH is used to indicate the power headroom value; P is used to indicate whether power backoff is applied to Medium Access Control MAC; and PCMAX,c is used to indicate maximum transmit power $P_{CMAX,c}$ or $\tilde{P}_{CMAX,c}$ of the terminal in a cell c that is used to calculate PH. Type 2 and Type 1 are two PH calculation manners. The PH calculation manner of Type 1 is: PCMAX,c−power for a PUSCH. The PH calculation manner of Type 2 is: PCMAX,c−power for a PUCCH−power for a PUSCH. Table 1 provides content that needs to be included in a format of the PHR During specific reporting, specific values need to be filled in different fields, and different cells may have different values. An example is provided in Table 2.

TABLE 2

| 0 | 0 | 0 | 0 | 1 | 0 | 0 | 0 |
|---|---|---|---|---|---|---|---|
| 1 | 0 |   |   | 20 | | | |
| 0 | 0 |   |   | 60 | | | |
| 1 | 0 |   |   | 30 | | | |
| 0 | 0 |   |   | 60 | | | |
| 1 | 0 |   |   | 25 | | | |
| 0 | 0 |   |   | 50 | | | |

A value of PH and a value of PCMAX,c each are indicated by using six bits, for example, 20 in Table 2 may be indicated as 010100.

Optionally, based on the format of the PHR report, the terminal may generate the PHR report for the SRS-only CC in the following several manners. Specific manners are as follows:

In a possible implementation, the terminal generates the field Ci, the field R, the field V, the field PH, the field P, and the field PCMAX,c; when the terminal reports the PHR for the SRS-only CC, the terminal sets Ci to 1; when the terminal does not report the PHR for the SRS-only CC, the terminal sets Ci to 0; when the terminal determines that an SRS is sent on the SRS-only CC, the terminal sets V to 0, and calculates PH by using a first formula; and when the terminal determines that no SRS is sent on the SRS-only CC, the terminal sets V to 1, and calculates PH by using a second formula. To be specific, a format of the PHR for the SRS-only CC is provided in Table 3.

TABLE 3

| C7 | C6 | C5 | C4 | C3 | C2 | C1 | R |
|----|----|----|----|----|----|----|---|
| P  | V  |    |    | PH (Type 3, SRS-only CC) | | | |
| R  | R  |    |    | PCMAX, $c_n$ | | | |

Type 3 is defined as follows: When the terminal determines that an SRS is sent on the SRS-only CC, the terminal sets V to 0, and calculates PH by using a first formula; and when the terminal determines that no SRS is sent on the SRS-only CC, the terminal sets V to 1, and calculates PH by using a second formula. Herein, the first formula is as follows:

$$PH_{type1,c}(i)=P_{CMAX,c}(i)-\{10\log_{10}(M_{SRS,c}(i))+P_{O\_SRS,c}(1)+\alpha_{SRS,c}\cdot PL_c+f_c(i)\},$$

where i is a subframe number; c is a cell index; $PH_{type1,c}$ is power headroom in a cell; $P_{CMAX,c}$ is configured maximum transmit power in the cell; $M_{SRS,c}$ is a quantity of bandwidth resources occupied when the SRS is actually sent in the cell; $P_{O\_SRS,c}(1)$ is power at which the base station expects to receive the SRS; $\alpha_{SRS,c}$ is a cell path loss compensation coefficient; $PL_c$ is a cell path loss; and $f_c(i)$ is cell power adjustment; and the second formula is as follows:

$$PH_{type1,c}(i)=\tilde{P}_{CMAX,c}(i)-\{P_{O\_SRS,c}(1)+\alpha_{SRS,c}\cdot PL_c+f_c(i)\};$$

where i is a subframe number; c is a cell index; $PH_{type1,c}$ is power headroom in a cell; $\tilde{P}_{CMAX,c}$ is a linear average of $P_{CMAX,c}$; $P_{O\_SRS,c}(1)$ is power at which the base station expects to receive the SRS; $\alpha_{SRS,c}$ is a cell path loss compensation coefficient; $PL_c$ is a cell path loss; and $f_c(i)$ is cell power adjustment.

In another possible implementation, if the terminal determines that the SRS is sent on the SRS-only CC, the terminal generates the field Ci, the field R, the field PH, the field P. and the field PCMAX,c; when the terminal reports the PHR for the SRS-only CC, the terminal sets Ci to 1; and when the terminal does not report the PHR for the SRS-only CC, the terminal sets Ci to 0, and calculates PH by using the first formula. To be specific, a format of the PHR for the SRS-only CC is provided in Table 4.

TABLE 4

| C7 | C6 | C5 | C4 | C3 | C2 | C1 | R |
|----|----|----|----|----|----|----|---|
| P  | R  |    |    | PH (Type 3, SRS-only CC) | | | |
| R  | R  |    |    | PCMAX, $c_n$ | | | |

In another possible implementation, the terminal generates the field Ci, the field V, the field PH, the field P, the field PCMAX,c, a field I, and a field S; when the PHR report is a PHR report for the SRS-only CC, the terminal sets I to 1, and the terminal sets V to 0; when the terminal determines that an SRS is sent on the SRS-only CC, the terminal sets S to 0, and calculates PH by using the first formula; and when the terminal determines that no SRS is sent on the SRS-only CC, the terminal sets S to 1, and calculates PH by using the second formula. To be specific, a format of the PHR for the SRS-only CC is provided in Table 5.

TABLE 5

| C7 | C6 | C5 | C4 | C3 | C2 | C1 | R |
|----|----|----|----|----|----|----|---|
| P  | R  |    |    |    |    |    | PH (Type 3, SRS-only CC) |
| I  | S  |    |    |    |    |    | PCMAX, $c_n$ |

In another possible implementation, the PHR report further includes a PHR report for a primary serving cell PCell and a PHR report for a secondary serving cell SCell. Based on the PHR report for the SRS-only CC that is generated by the terminal, if the PHR report further includes a PHR report for a PCell and a PHR report for an SCell, a specific form is provided in each of Table 6. Table 7, and Table 8.

TABLE 6

| C7 | C6 | C5 | C4 | C3 | C2 | C1 | R |
|----|----|----|----|----|----|----|---|
| P | V | | | | | | PH (Type 2, PCell) |
| R | R | | | | | | PCMAX, $c_1$ |
| P | V | | | | | | PH (Type 1, PCell) |
| R | R | | | | | | PCMAX, $c_2$ |
| P | V | | | | | | PH (Type 1, SCell 1) |
| R | R | | | | | | PCMAX, $c_3$ |
| P | V | | | | | | PH (Type 3, SRS-only CC 1) |
| R | R | | | | | | PCMAX, $c_4$ |
| ... | | | | | | | |
| P | V | | | | | | PH (Type 1, SCell n) |
| R | R | | | | | | PCMAX, $c_m$ |
| P | V | | | | | | PH (Type 3, SRS-only CC x) |
| R | R | | | | | | PCMAX, $c_y$ |

TABLE 7

| C7 | C6 | C5 | C4 | C3 | C2 | C1 | R |
|----|----|----|----|----|----|----|---|
| P | V | | | | | | PH (Type 2, PCell) |
| R | R | | | | | | PCMAX, $c_1$ |
| P | V | | | | | | PH (Type 1, PCell) |
| R | R | | | | | | PCMAX, $c_2$ |
| P | V | | | | | | PH (Type 1 SCell 1) |
| R | R | | | | | | PCMAX, $c_3$ |
| P | R | | | | | | PH (Type 3, SRS-only CC 1) |
| R | R | | | | | | PCMAX, $c_4$ |
| ... | | | | | | | |
| P | V | | | | | | PH (Type 1, SCell n) |
| R | R | | | | | | PCMAX, $c_m$ |
| P | R | | | | | | PH (Type 3, SRS-only CCx) |
| R | R | | | | | | PCMAX, $c_y$ |

TABLE 8

| C7 | C6 | C5 | C4 | C3 | C2 | C1 | R |
|----|----|----|----|----|----|----|---|
| P | V | | | | | | PH (Type 2, PCell) |
| R | R | | | | | | PCMAX, $c_1$ |
| P | V | | | | | | PH (Type 1, PCell) |
| R | R | | | | | | PCMAX, $c_2$ |
| P | V | | | | | | PH (Type 1, SCell 1) |
| I | S | | | | | | PCMAX, $c_3$ |
| P | V | | | | | | PH (Type 3, SRS-only CC 1) |
| I | S | | | | | | PCMAX, $c_4$ |
| ... | | | | | | | |
| P | V | | | | | | PH (Type 1, SCell n) |
| I | S | | | | | | PCMAX, $c_m$ |
| P | V | | | | | | PH (Type 3, SRS-only CC x) |
| I | S | | | | | | PCMAX, $c_y$ |

202. The terminal sends the PHR report to a base station.

The terminal sends the generated PHR report to the base station.

In this embodiment of this application, when satisfying the preset condition, the terminal generates the PHR report for the SRS-only CC, and then sends the PHR report to the base station. To be specific, this helps the base station learn of uplink transmit power of the terminal on the SRS-only CC, to perform corresponding uplink scheduling.

The data processing method in this embodiment of this application is described above, and a terminal and a base station in embodiments of this application are described below.

Figure 3:
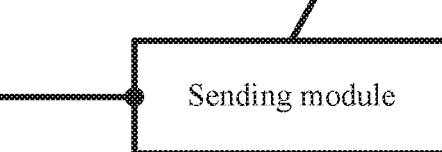
FIG. 3 is a schematic diagram of an embodiment of a terminal according to an embodiment of this application.

Specifically, referring to FIG. 3, an embodiment of a terminal in the embodiments of this application includes:

a processing module 301, configured to: when a preset condition is satisfied, generate a power headroom report PHR report for a sounding reference signal only component carrier SRS-only CC; and a sending module 302, configured to send the PHR report generated by the processing module 301 to a base station.

Optionally, the preset condition is at least one of the following:

the terminal receives an indication message sent by the base station, where the indication message is used to instruct the terminal to trigger the power headroom report PHR for the sounding reference signal only component carrier SRS-only CC;

the preset condition is that the terminal determines that a power variation or a path loss variation on the SRS-only CC exceeds a first preset value;

the preset condition is that the terminal determines that a power variation or a path loss variation on a reference SRS-only CC exceeds a second preset value, where the reference SRS-only CC is preconfigured by the base station for the terminal; and the preset condition is that the terminal determines that the SRS-only CC is reconfigured.

Optionally, the PHR report includes a field Ci, a field R, a field V, a field PH, a field P, and a field PCMAX,c; Ci is used to indicate whether there is a field PH for a secondary serving cell having a secondary serving cell index; R is a reserved bit, and is set to 0; V is used to indicate that a power headroom value PH is calculated based on a format for actual sending or a reference format; PH is used to indicate the power headroom value; P is used to indicate whether power backoff is applied to Medium Access Control MAC; and PCMAX,c is used to indicate maximum transmit power $P_{CMAX,c}$ or $\tilde{P}_{CMAX,c}$ of the terminal in a cell c that is used to calculate PH.

Optionally, the processing module 301 is further specifically configured to: generate the field Ci, the field R, the field V, the field PH, the field P, and the field PCMAX,c; when the PHR for the SRS-only CC is reported, set Ci to 1; when the PHR for the SRS-only CC is not reported, set Ci to 0; when it is determined that an SRS is sent on the SRS-only CC, set V to 0, and calculate PH by using a first formula; and when it is determined that no SRS is sent on the SRS-only CC, set V to 1, and calculate PH by using a second formula.

Optionally, the processing module 301 is further specifically configured to: if it is determined that the SRS is sent on the SRS-only CC, generate the field Ci, the field R, the field PH, the field P, and the field PCMAX,c; when the PHR for the SRS-only CC is reported, set Ci to 1; and when the PHR for the SRS-only CC is not reported, set Ci to 0, and calculate PH by using the first formula.

Optionally, the processing module 301 is further specifically configured to: generate the field Ci, the field V, the field PH, the field P, the field PCMAX,c, a field I, and a field S; when the PHR report is a report for the SRS-only CC, set I to 1, and set V to 0; when it is determined that an SRS is sent on the SRS-only CC, set S to 0, and calculate PH by using the first formula; and when it is determined that no SRS is sent on the SRS-only CC, set S to 1, and calculate PH by using the second formula.

Optionally, the first formula is as follows:

$$PH_{typel,c}(i)=P_{CMAX,c}(i)-\{10\log_{10}(M_{SRS,c}(i))+P_{O\_SRS,c}(1)+\alpha_{SRS,c}\cdot PL_c+f_c(i)\},$$

where i is a subframe number; c is a cell index; $PH_{typel,c}$ is power headroom in a cell; $P_{CMAX,c}$ is configured maximum transmit power in the cell; $M_{SRS,c}$ is a quantity of bandwidth resources occupied when the SRS is actually sent in the cell; $P_{O\_SRS,c}(1)$ is power at which the base station expects to receive the SRS; $\alpha_{SRS,c}$ is a cell path loss compensation coefficient; $PL_c$ is a cell path loss; and $f_c(i)$ is cell power adjustment; and the second formula is as follows:

$$PH_{typel,c}(i)=\tilde{P}_{CMAX,c}(i)-\{P_{O\_SRS,c}(1)+\alpha_{SRS,c}\cdot PL_c+f_c(i)\},$$

where i is a subframe number; c is a cell index; $PH_{typel,c}$ is power headroom in a cell; $\tilde{P}_{CMAX,c}$ is a linear average of $P_{CMAX,c}$; $P_{O\_SRS,c}(1)$ is power at which the base station expects to receive the SRS; $\alpha_{SRS,c}$ is a cell path loss compensation coefficient; $PL_c$ is a cell path loss; and $f_c(i)$ is cell power adjustment.

Optionally, the PHR report further includes a PHR report for a primary serving cell PCell and a PHR report for a secondary serving cell SCell.

Further, the terminal in FIG. 3 may be further configured to perform any step performed by the terminal in FIG. 1 or FIG. 2, to implement any function that can be implemented by the terminal in FIG. 1 or FIG. 2.

In this embodiment of this application, when the terminal satisfies the preset condition, the processing module 301 generates the PHR report for the SRS-only CC, and then the sending module 302 sends the PHR report to the base station. To be specific, this helps the base station learn of uplink transmit power of the terminal on the SRS-only CC, to perform corresponding uplink scheduling.

Figure 4:
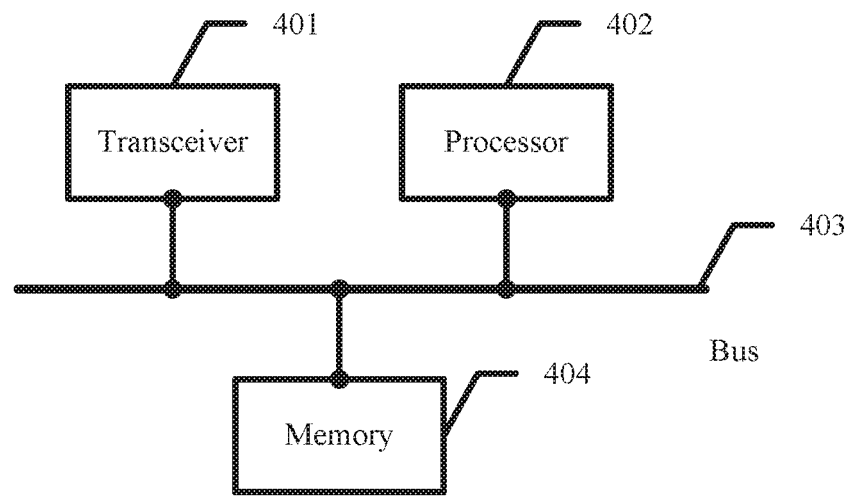
FIG. 4 is a schematic diagram of another embodiment of a terminal according to an embodiment of this application.

Specifically, referring to FIG. 4, another embodiment of a terminal in the embodiments of this application includes a transceiver 401 and a processor 402. The transceiver 401 is connected to the processor 402 by using a bus 403.

The bus 403 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of representation, only one thick line is used to represent the bus in FIG. 4, but this does not mean that there is only one bus or only one type of bus.

The processor 402 may be a central processing unit (central processing unit, CPU for short), a network processor (network processor, NP for short), or a combination of a CPU and an NP.

The processor 402 may further include a hardware chip. The hardware chip may be an application-specific integrated circuit (application-specific integrated circuit, ASIC for short), a programmable logic device (programmable logic device, PLD for short), or a combination thereof. The PLD may be a complex programmable logic device (complex programmable logic device, CPLD for short), a field-programmable gate array (field-programmable gate array, FPGA for short), generic array logic (generic array logic, GAL for short), or any combination thereof.

Referring to FIG. 4, the terminal may further include a memory 404. The memory 404 may include a volatile memory (volatile memory) such as a random access memory (random-access memory, RAM for short). The memory may also include a non-volatile memory (non-volatile memory) such as a flash memory (flash memory), a hard disk drive (hard disk drive, HDD for short), or a solid-state drive (solid-state drive, SSD for short). The memory 404 may further include a combination of the foregoing types of memories.

Optionally, the memory 404 may be further configured to store a program instruction. The processor 402 invokes the program instruction stored in the memory 404, to perform one or more steps in the embodiment shown in FIG. 2, or an optional implementation in the embodiment shown in FIG. 2, so as to implement a function of performing an operation of the terminal in the foregoing method.

The processor 402 implements step 201 in the foregoing embodiment.

The transceiver 401 includes a radio frequency module and an antenna. The radio frequency module may be connected to the processor 402 by using the bus 403. The radio frequency module and the antenna perform step 202 in the foregoing embodiment.

In this embodiment of this application, when the terminal satisfies the preset condition, the processor 402 generates the PHR report for the SRS-only CC, and then the transceiver 401 sends the PHR report to the base station. To be specific, this helps the base station learn of uplink transmit power of the terminal on the SRS-only CC, to perform corresponding uplink scheduling.

Figure 5:
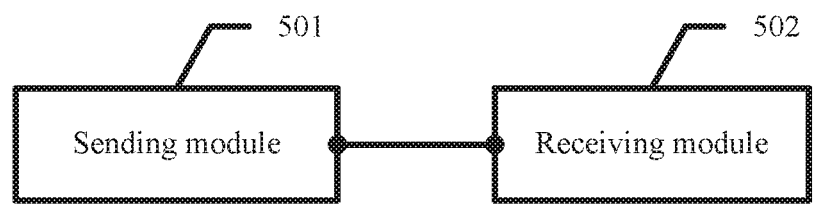
FIG. 5 is a schematic diagram of an embodiment of a base station according to an embodiment of this application.

Specifically, referring to FIG. 5, an embodiment of a base station in the embodiments of this application includes:

a sending module 501, configured to send an indication message to a terminal, where the indication message is used to instruct the terminal to trigger a PHR for the SRS-only CC; and a receiving module 502, configured to receive the PHR report, where the PHR report is generated by the terminal after the terminal receives the indication message.

Optionally, the sending module 501 is further specifically configured to send a Medium Access Control control element MAC CE to the terminal, where the MAC CE includes a field Ci, and Ci is used to indicate a cell index Cell index of the SRS-only CC; or the sending module 501 is further specifically configured to send a radio network temporary identifier RNTI to the terminal, so that the terminal triggers the PHR for the SRS-only CC when detecting downlink control signaling for addressing the RNTI; or the sending module 501 is further specifically configured to add a target bit to downlink control information, where the target bit is used to instruct the terminal to trigger the PHR for the SRS-only CC.

Further, the base station in FIG. 5 may be further configured to perform any step performed by the base station in FIG. 1 or FIG. 2, to implement any function that can be implemented by the base station in FIG. 1 or FIG. 2.

In this embodiment of this application, after the sending module 501 sends the indication message to the terminal, the receiving module 502 receives the PHR report sent by the terminal, so that a time interval at which the terminal reports the PHR report can be more flexible.

Figure 6:
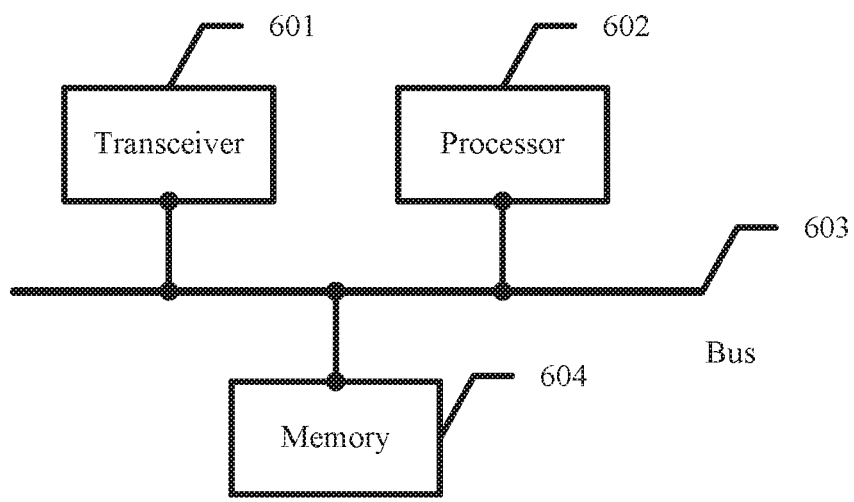
FIG. 6 is a schematic diagram of another embodiment of a base station according to an embodiment of this application.

Specifically, referring to FIG. 6, another embodiment of a base station in the embodiments of this application includes a transceiver 601 and a processor 602. The transceiver 601 is connected to the processor 602 by using a bus 603.

The bus 603 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of representation, only one thick line is used to represent the bus in FIG. 6, but this does not mean that there is only one bus or only one type of bus.

The processor 602 may be a central processing unit (central processing unit, CPU for short), a network processor (network processor, NP for short), or a combination of a CPU and an NP.

The processor 602 may further include a hardware chip. The hardware chip may be an application-specific integrated circuit (application-specific integrated circuit, ASIC for short), a programmable logic device (programmable logic device, PLD for short), or a combination thereof. The PLD may be a complex programmable logic device (complex programmable logic device, CPLD for short), a field-programmable gate array (field-programmable gate array, FPGA for short), generic array logic (generic array logic, GAL for short), or any combination thereof.

Referring to FIG. 6, the base station may further include a memory 604. The memory 604 may include a volatile memory (volatile memory) such as a random access memory (random-access memory, RAM for short). The memory may also include a non-volatile memory (non-volatile memory) such as a flash memory (flash memory), a hard disk drive (hard disk drive, HDD for short), or a solid-state drive (solid-state drive, SSD for short). The memory 604 may further include a combination of the foregoing types of memories.

Optionally, the memory 604 may be further configured to store a program instruction. The processor 602 invokes the program instruction stored in the memory 604, and can perform one or more steps in the embodiment shown in FIG. 2, or an optional implementation in the embodiment shown in FIG. 2, so as to implement a function of performing an operation of the base station in the foregoing method.

The transceiver 601 includes a radio frequency module and an antenna. The radio frequency module may be connected to the processor 602 by using the bus 603. The radio frequency module and the antenna perform actions of sending the indication information to the terminal, and receiving the PHR report sent by the terminal by the base station in step 201 in the foregoing embodiment.

In this embodiment of this application, after sending the indication message to the terminal, the transceiver 601 receives the PHR report sent by the terminal, so that a time interval at which the terminal reports the PHR report can be more flexible.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A data processing method implemented by a terminal, comprising:
   determining whether a power variation or a path loss variation on a sounding reference signal only component carrier (SRS-only CC) exceeds a first preset value;
   generating a power headroom report (PHR) for the SRS-only CC in response to determining that the power variation or the path loss variation on the SRS-only CC exceeds the first preset value, wherein the PHR for the SRS-only CC describes an uplink transmit power of the terminal on the SRS-only CC, wherein the PHR comprises a field Ci indicating a cell index of the SRS-only CC, wherein the field Ci is set to one when the terminal reports the PHR for the SRS-only CC, and wherein the field Ci is set to zero when the terminal does not report the PHR for the SRS-only CC; and
   sending the PHR to a base station.

2. The method of claim 1, wherein the PHR further comprises a field R, a field V, a field PH, a field P, and a field PCMAX,c, wherein the field R is a reserved bit and is set to 0, wherein the field V indicates that a power headroom value is calculated based on a format for actual sending or a reference format, wherein the field PH indicates the power headroom value, wherein the field P indicates whether power backoff is applied to Medium Access Control (MAC), and wherein the field PCMAX,c indicates a maximum transmit power of the terminal in a cell c that is used to calculate the power headroom value.

3. The method of claim 2, wherein the generating the PHR for the SRS-only CC comprises:
generating the field Ci, the field R, the field V, the field PH, the field P, and the field PCMAX,c;
when the terminal reports the PHR for the SRS-only CC, setting the field Ci to one;
when the terminal does not report the PHR for the SRS-only CC, setting the field Ci to zero;
when the terminal determines that an SRS is sent on the SRS-only CC, setting the field V to zero; and
when the terminal determines that no SRS is sent on the SRS-only CC, setting the field V to one.

4. The method of claim 2, wherein the generating the PHR for the SRS-only CC comprises:
generating the field Ci, the field V, the field PH, the field P, the field PCMAX,c, a field I, and a field S;
when the PHR is a report for the SRS-only CC:
setting the field I to one; and
setting the field V to zero;
when the terminal determines that an SRS is sent on the SRS-only CC, setting the field S to zero; and
when the terminal determines that no SRS is sent on the SRS-only CC, setting the field S to one.

5. The method of claim 2, wherein the PHR further comprises a first PHR for a primary serving cell (PCell) and a second PHR for a secondary serving cell (SCell).

6. The method of claim 2, wherein generating the PHR for the SRS-only CC comprises:
generating the field Ci, the field R, the field V, the field PH, the field P, and the field PCMAX,c; and
when the terminal reports the PHR for the SRS-only CC, setting the field Ci to one.

7. The method of claim 2, wherein generating the PHR for the SRS-only CC comprises:
generating the field Ci, the field R, the field V, the field PH, the field P, and the field PCMAX,c; and
when the terminal determines that an SRS is sent on the SRS-only CC, setting the field V to zero.

8. The method of claim 2, wherein generating the PHR for the SRS-only CC comprises:
generating the field Ci, the field R, the field V, the field PH, the field P, and the field PCMAX,c; and
when the terminal determines that no SRS is sent on the SRS-only CC, setting the field V to one.

9. The method of claim 2, wherein generating the PHR for the SRS-only CC comprises:
generating the field Ci, the field R, the field V, the field PH, the field P, and the field PCMAX,c;
when the terminal determines that an SRS is sent on the SRS-only CC, setting the field V to zero; and
when the terminal determines that no SRS is sent on the SRS-only CC, setting the field V to one.

10. The method of claim 1, further comprising generating the power headroom report (PHR) for the SRS-only CC in response to determining that the power variation or the path loss variation on the SRS-only CC exceeds a second preset value.

11. A terminal, comprising:
at least one processor; and
a memory coupled to the at least one processor and storing programming instructions that, when executed by the at least one processor, cause the terminal to:
determine whether a power variation or a path loss variation on a sounding reference signal only component carrier (SRS-only CC) exceeds a first preset value;
generate a power headroom report (PHR) for the SRS-only CC in response to the power variation or the path loss variation on the SRS-only CC exceeding the first preset value, wherein the PHR for the SRS-only CC describes an uplink transmit power of the terminal on the SRS-only CC, wherein the PHR comprises a field Ci indicating a cell index of the SRS-only CC, wherein the field Ci is set to one when the terminal reports the PHR for the SRS-only CC, and wherein the field Ci is set to zero when the terminal does not report the PHR for the SRS-only CC; and
send the PHR to a base station.

12. The terminal of claim 11, wherein the PHR comprises a field R, a field V, a field PH, a field P, and a field PCMAX,c, wherein the field R is a reserved bit and is set to zero, wherein the field V indicates that a power headroom value is calculated based on a format for actual sending or a reference format, wherein the field PH indicates the power headroom value, wherein the field P indicates whether power backoff is applied to Medium Access Control (MAC), and wherein the field PCMAX,c indicates maximum transmit power of the terminal in a cell c that is used to calculate the power headroom value.

13. The terminal of claim 12, wherein the programming instructions, when executed by the processor, cause the terminal to generate the PHR for the SRS-only CC by causing the terminal to:
generate the field Ci, the field R, the field V, the field PH, the field P, and the field PCMAX,c;
when the terminal reports the PHR for the SRS-only CC, set the field Ci to one;
when the terminal does not report the PHR for the SRS-only CC, set the field Ci to zero;
when the terminal determines that an actual SRS is sent on the SRS-only CC, set the field V to zero; and
when the terminal determines that no SRS is sent on the SRS-only CC, set the field V to one.

14. The terminal of claim 12, wherein the programming instructions, when executed by the processor, cause the terminal to generate the PHR for the SRS-only CC by causing the terminal to:
generate the field Ci, the field V, the field PH, the field P, the field PCMAX,c, a field I, and a field S;
when the PHR is a report for the SRS-only CC:
set the field I to one; and
set the field V to zero;
when the terminal determines that an SRS is sent on the SRS-only CC, set the field S to zero; and
when the terminal determines that no SRS is sent on the SRS-only CC, set the field S to one.

15. The terminal of claim 12, wherein the PHR further comprises a first PHR for a primary serving cell (PCell) and a second PHR for a secondary serving cell (SCell).

16. The terminal of claim 11, wherein the programming instructions, when executed by the processor, cause the terminal to generate the power headroom report (PHR) for the SRS-only CC in response to the power variation or the path loss variation on the SRS-only CC exceeding a second preset value.

17. A base station, comprising:
   at least one processor; and
   a memory coupled to the at least one processor and storing programming instructions that, when executed by the at least one processor, cause the base station to:
      send an indication message to a terminal, wherein the indication message instructs the terminal to trigger a power headroom report (PHR) for a sounding reference signal only component carrier (SRS-only CC), wherein the PHR for the SRS-only CC describes an uplink transmit power of the terminal on the SRS-only CC, wherein the PHR comprises a field Ci indicating a cell index of the SRS-only CC, wherein the field Ci is set to one when the terminal reports the PHR for the SRS-only CC, and wherein the field Ci is set to zero when the terminal does not report the PHR for the SRS-only CC; and
      receive the PHR in response to the indication message, wherein the PHR is generated after sending the indication message.

18. The base station of claim 17, wherein the programming instructions, when executed by the at least one processor, cause the base station to send the indication message to the terminal by causing the base station to send a Medium Access Control (MAC) control element (MAC CE) to the terminal.

19. The base station of claim 17, wherein the programming instructions, when executed by the at least one processor, cause the base station to send the indication message to the terminal by causing the base station to send a radio network temporary identifier (RNTI) to the terminal to cause the terminal to trigger the PHR for the SRS-only CC when downlink control signaling for addressing the RNTI is detected.

20. The base station of claim 17, wherein the programming instructions, when executed by the at least one processor, cause the base station to send the indication message to the terminal by causing the base station to add a target bit to downlink control information, and wherein the target bit instructs the terminal to trigger the PHR for the SRS-only CC.

* * * * *